US012608449B2

(12) United States Patent
Badr

(10) Patent No.: US 12,608,449 B2
(45) Date of Patent: Apr. 21, 2026

(54) DIGITAL RIGHTS MANAGEMENT FOR NFTS ACROSS SEARCH SURFACES

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 307 days.

(21) Appl. No.: 18/077,650

(22) Filed: Dec. 8, 2022

(65) Prior Publication Data

US 2024/0054190 A1     Feb. 15, 2024

Related U.S. Application Data

(60) Provisional application No. 63/397,962, filed on Aug. 15, 2022.

(51) Int. Cl.
*G06F 21/16* (2013.01)
(52) U.S. Cl.
CPC ...... *G06F 21/16* (2013.01); *G06F 2221/2141* (2013.01)
(58) Field of Classification Search
CPC .......................... G06F 21/16; G06F 2221/2141
See application file for complete search history.

(56) References Cited

U.S. PATENT DOCUMENTS

| | | | |
|---|---|---|---|
| 11,348,152 B1 * | 5/2022 | Davis ................. | G06Q 30/0601 |
| 2022/0374503 A1 * | 11/2022 | Goldston ............. | G06F 3/0481 |
| 2023/0017499 A1 * | 1/2023 | Agrawal .............. | H04L 9/3236 |
| 2023/0122552 A1 * | 4/2023 | Meyers ................ | H04L 9/3228 |
| | | | 463/29 |
| 2023/0186353 A1 * | 6/2023 | Wadley ............. | G06Q 30/0278 |
| | | | 705/306 |
| 2023/0252088 A1 * | 8/2023 | Porter .................. | H04L 9/3239 |
| | | | 715/234 |
| 2023/0353570 A1 * | 11/2023 | Lee .......................... | H04L 63/10 |
| 2023/0359709 A1 * | 11/2023 | Nickerson .............. | G06V 20/20 |
| 2023/0401195 A1 * | 12/2023 | Miriyala .................. | B66B 3/00 |
| 2024/0054190 A1 * | 2/2024 | Badr ....................... | G06F 21/16 |
| 2024/0070306 A1 * | 2/2024 | Jurat .................. | G06F 21/6218 |
| 2024/0104173 A1 * | 3/2024 | Tiseanu ................. | G06F 21/31 |
| 2024/0104551 A1 * | 3/2024 | Lu ........................ | G06F 16/2455 |

* cited by examiner

*Primary Examiner* — Gary S Gracia
(74) *Attorney, Agent, or Firm* — DORITY & MANNING, P.A.

(57)     ABSTRACT

Systems and methods for digital rights management can include embedding a content item and a set of permissions in the blockchain. The systems and methods may obtain the set of permissions via a user interface. The systems and methods may embed the data such that when a content item is surfaced, the permissions are also surfaced. The systems and methods may include embedding a content-specific identifier in the content item, which can allow for copies to be identified by searching for the identifier.

20 Claims, 12 Drawing Sheets

600

602 — OBTAIN A MEDIA CONTENT ITEM

604 — OBTAIN ONE OR MORE USER INPUTS

606 — DETERMINE THE ONE OR MORE USER INPUTS ARE ASSOCIATED WITH A SELECTION OF ONE OR MORE PERMISSIONS

608 — GENERATE NON-FUNGIBLE TOKEN DATA BASED ON THE MEDIA CONTENT ITEM AND THE ONE OR MORE PERMISSIONS

610 — REGISTER THE NON-FUNGIBLE TOKEN DATA WITH A BLOCKCHAIN

<u>600</u>

602 — OBTAIN A MEDIA CONTENT ITEM

604 — OBTAIN ONE OR MORE USER INPUTS

606 — DETERMINE THE ONE OR MORE USER INPUTS ARE ASSOCIATED WITH A SELECTION OF ONE OR MORE PERMISSIONS

608 — GENERATE NON-FUNGIBLE TOKEN DATA BASED ON THE MEDIA CONTENT ITEM AND THE ONE OR MORE PERMISSIONS

610 — REGISTER THE NON-FUNGIBLE TOKEN DATA WITH A BLOCKCHAIN

700

702 — PROVIDE A MEDIA CONTENT ITEM FOR DISPLAY

704 — OBTAIN INPUT DATA FROM A USER COMPUTING SYSTEM

706 — OBTAIN PERMISSION DATA ASSOCIATED WITH THE MEDIA CONTENT ITEM BASED ON THE INPUT DATA

708 — PROVIDE A USER INTERFACE ELEMENT FOR DISPLAY

800

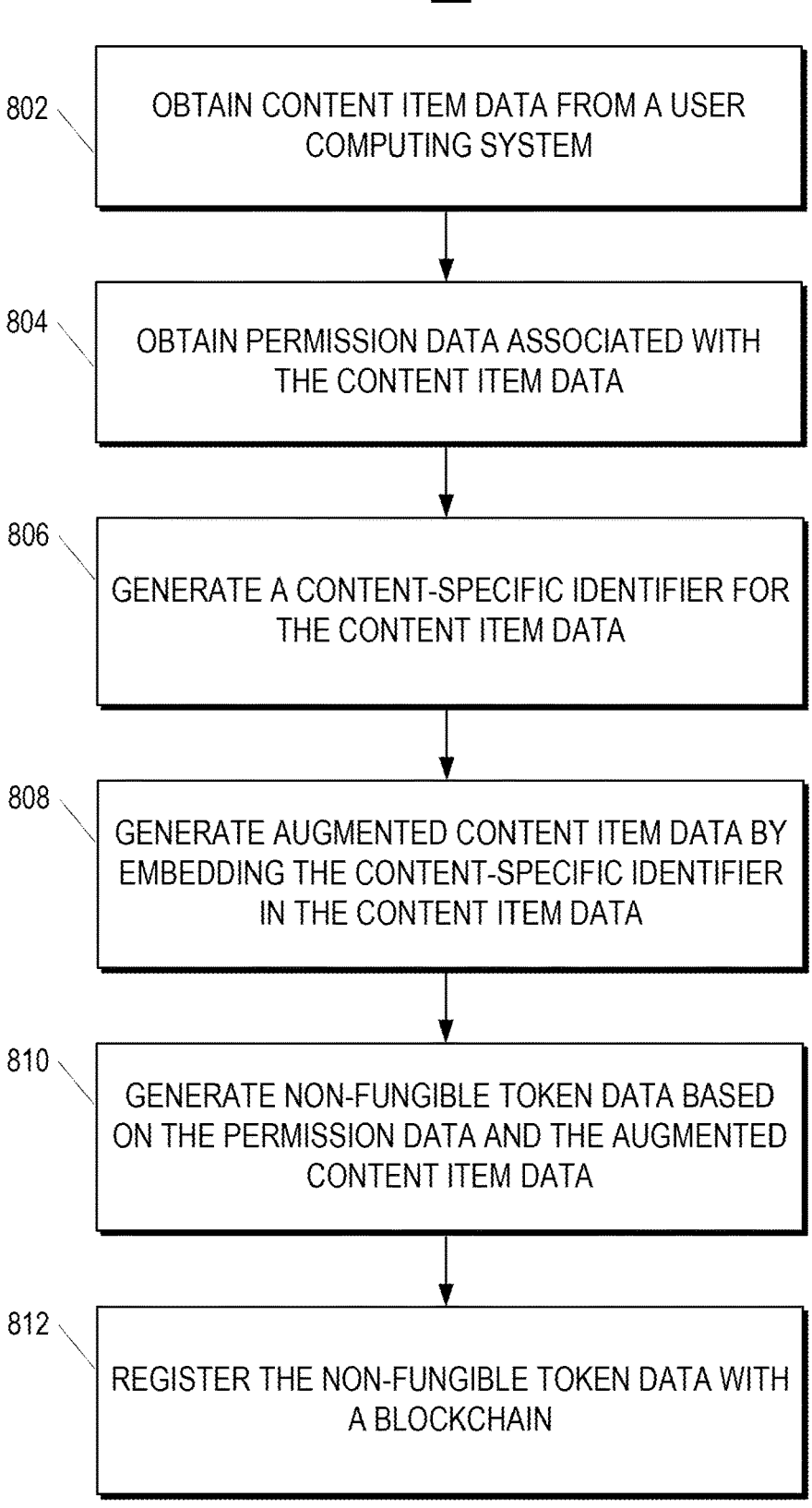

802 — OBTAIN CONTENT ITEM DATA FROM A USER COMPUTING SYSTEM

804 — OBTAIN PERMISSION DATA ASSOCIATED WITH THE CONTENT ITEM DATA

806 — GENERATE A CONTENT-SPECIFIC IDENTIFIER FOR THE CONTENT ITEM DATA

808 — GENERATE AUGMENTED CONTENT ITEM DATA BY EMBEDDING THE CONTENT-SPECIFIC IDENTIFIER IN THE CONTENT ITEM DATA

810 — GENERATE NON-FUNGIBLE TOKEN DATA BASED ON THE PERMISSION DATA AND THE AUGMENTED CONTENT ITEM DATA

812 — REGISTER THE NON-FUNGIBLE TOKEN DATA WITH A BLOCKCHAIN

Figure 8

DIGITAL RIGHTS MANAGEMENT FOR NFTS ACROSS SEARCH SURFACES

RELATED APPLICATIONS

This application claims priority to and the benefit of U.S. Provisional Patent Application No. 63/397,962, filed Aug. 15, 2022. U.S. Provisional Patent Application No. 63/397, 962 is hereby incorporated by reference in its entirety.

FIELD

The present disclosure relates generally to blockchain-enabled digital rights management. More particularly, the present disclosure relates to minting a non-fungible token on a blockchain with one or more permissions embedded in the non-fungible token data.

BACKGROUND

Content items displayed on the internet may be published with the intent to have certain permissions and copyright agreements attached. However, users may disregard these permissions and copyright licenses, which can cause the owner of the content item to have their content item used in a way not originally intended. The issue can occur in a social media setting as users find content items that they later want to use for their own purposes. Additionally, databases and content aggregators may save and reproduce the content item without checking the permissions or the copyright license.

SUMMARY

Aspects and advantages of embodiments of the present disclosure will be set forth in part in the following description, or can be learned from the description, or can be learned through practice of the embodiments.

One example aspect of the present disclosure is directed to a computing system for digital rights management. The system can include one or more processors and one or more non-transitory computer-readable media that collectively store instructions that, when executed by the one or more processors, cause the computing system to perform operations. The operations can include obtaining a media content item. The media content item can be associated with a particular user. The operations can include obtaining one or more user inputs. The one or more user inputs can be associated with the particular user. The operations can include determining the one or more user inputs are associated with a selection of one or more permissions. In some implementations, the one or more permissions can be associated with the media content item. The operations can include generating non-fungible token data based on the media content item and the one or more permissions. One or more references to the media content item can be embedded in the non-fungible token data. The one or more permissions can be embedded in the non-fungible token data. In some implementations, the one or more permissions can be configured to be identifiable for display with the media content item. The operations can include registering the non-fungible token data with a blockchain. The blockchain can be associated with a decentralized blockchain computing system.

Another example aspect of the present disclosure is directed to a computer-implemented method for digital rights management. The method can include providing, by a computing system including one or more processors, a media content item for display. The media content item can be a digital resource associated with a non-fungible token. In some implementations, the non-fungible token can be documented on a blockchain. The method can include obtaining, by the computing system, input data from a user computing system. The input data can be descriptive of one or more inputs to interact with the media content item. The method can include obtaining, by the computing system, permission data associated with the media content item based on the input data. The permission data can be stored on the blockchain. In some implementations, the permission data can be descriptive of one or more permissions associated with the media content item. The method can include providing, by the computing system, a user interface element for display. The user interface element can include a notification. The notification can be descriptive of the one or more permissions associated with the media content item.

Another example aspect of the present disclosure is directed to one or more non-transitory computer-readable media that collectively store instructions that, when executed by one or more computing devices, cause the one or more computing devices to perform operations. The operations can include obtaining content item data from a user computing system. The content item data can be associated with a particular user. The operations can include obtaining permission data associated with the content item data. In some implementations, the permission data can be descriptive of one or more permissions for interacting with the content item data. The operations can include generating a content-specific identifier for the content item data. The content-specific identifier can include identification data that is specifically generated for the content item data. The operations can include generating augmented content item data by embedding the content-specific identifier in the content item data. The operations can include generating non-fungible token data based on the permission data and the augmented content item data. The non-fungible token data can include the permission data. In some implementations, the non-fungible token data can reference the augmented content item data. The operations can include registering the non-fungible token data with a blockchain.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts a flow chart diagram of an example method to perform permission-embedded non-fungible token generation according to example embodiments of the present disclosure.

Figure 1A:
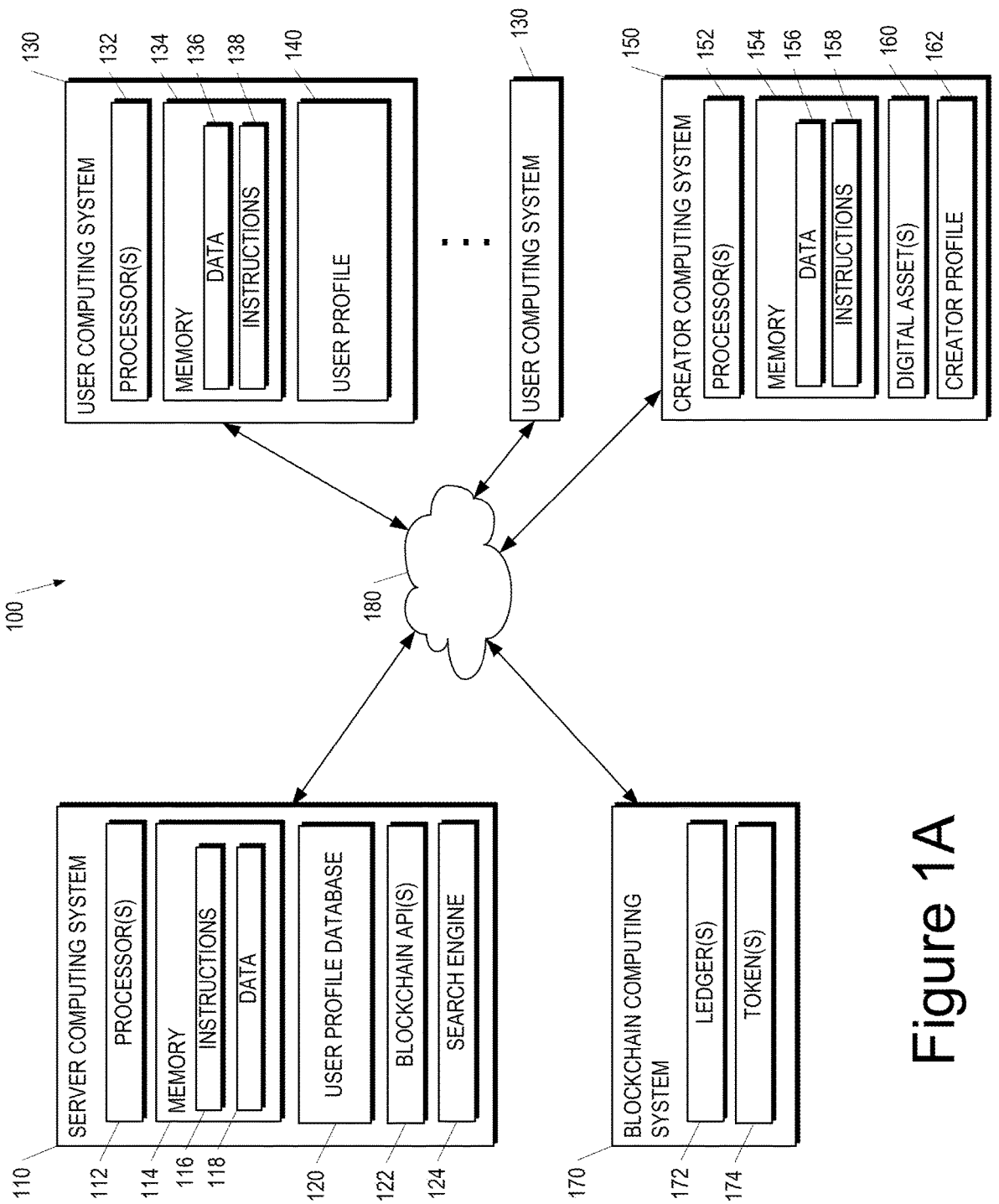
FIG. 1A depicts a block diagram of an example computing system that performs digital rights management according to example embodiments of the present disclosure.

Reference numerals that are repeated across plural figures are intended to identify the same features in various implementations.

DETAILED DESCRIPTION

Overview

Generally, the present disclosure is directed to systems and methods for digital rights management for content items. In particular, the systems and methods disclosed herein can leverage a blockchain and/or one or more user interface elements to manage the interactions with digital content items. For example, the systems and methods can include obtaining a media content item. The media content item can be associated with a particular user. The systems and methods can include obtaining one or more user inputs. The one or more user inputs can be associated with the particular user. The one or more user inputs can be determined to be associated with a selection of one or more permissions. The one or more permissions can be associated with the media content item. The systems and methods can include generating non-fungible token data based on the media content item and the one or more permissions. One or more references to the media content item can be embedded in the non-fungible token data. In some implementations, the one or more permissions can be embedded in the non-fungible token data. The one or more permissions can be configured to be identifiable for display with the media content item. The systems and methods can include registering the non-fungible token data with a blockchain. The blockchain can be associated with a decentralized blockchain computing system.

The systems and methods can obtain a content item (e.g., a media content item). The media content item can be associated with a particular user. The content item can include image data, video data, audio data, text data, and/or latent encoding data. The content item may be generated by and/or published by the particular user. The content item may be a content item stored locally by the particular user, may be stored in cloud storage for the particular user, and/or may be published on the web (e.g., on a social media website, a blog website, and/or a personal website).

The systems and methods can obtain one or more user inputs. The one or more user inputs can be associated with the particular user. The one or more user inputs can be obtained from a user computing system. In some implementations, the one or more user inputs can be inputs to a user interface provided via a server computing system. For example, one or more user interface elements can be provided in a content item management platform (e.g., a cloud storage web platform, a social media platform, and/or a content item repository platform). The one or more user inputs may be associated with a user interface with one or more options for selecting permissions to be associated with the obtained content item. For example, the one or more options can include do not allow republishing or copying, allow republishing or copying if revenue provided to original owner, allow republishing or copying freely, and/or any other form of permissions, which can include caveats manually input by a user.

The one or more user inputs can be determined to be associated with a selection of one or more permissions. The one or more permissions can be associated with the media content item. In some implementations, the one or more permissions can be associated with permissible interactions with the media content item. The permissible interactions can be associated with whether third parties can copy, republish, and/or share the content item. The determination can be based on heuristics, deterministic data, and/or one or more machine-learned parameters.

The systems and methods can generate non-fungible token data based on the media content item and the one or more permissions. One or more references to the media content item may be embedded in the non-fungible token data. In some implementations, the one or more permissions can be embedded in the non-fungible token data. The non-fungible token data can include smart contract data. In some implementations, the payload of the smart contract associated with the smart contract data may be the content item. The content item may be viewed as a digital resource that may be transferred based on the criteria of the smart contract. The smart contract data can include the one or more permissions. The one or more permissions may be configured to be identifiable for display with the media content item.

The non-fungible token data can be registered with a blockchain. The blockchain can be associated with a decentralized blockchain computing system. The non-fungible token data may be minted to the blockchain and may be associated with an electronic ledger that tracks transactions associated with the non-fungible token data. Additionally and/or alternatively, the non-fungible token data may be processed to generate index data associated with the non-fungible token data. The index data can then be added to a searchable database.

In some implementations, the systems and methods can obtain a display request associated with the media content item. The non-fungible token data associated with the media content item can be identified. The permission data associated with the media content item can then be obtained. A display dataset can then be generated. The display dataset can include the media content item and the permission data. The display dataset can be provided. In some implementations, the display request can be associated with a third party computing system. The display request can be generated based on a search query processed by a search engine. The media content item can be responsive to the search query. In some implementations, the systems and methods can include determining the display request complies with the one or more preferences. The display dataset can include executable code for providing a user interface for displaying the one or more preferences in response to a selection of the media content item.

Alternatively and/or additionally, the systems and methods can include obtaining a search query from a third party computing system and processing the search query to determine a plurality of search results responsive to the search query. The plurality of search results can include the media content item.

In some implementations, the systems and methods can include determining the plurality of search results include one or more particular search results associated with one or more respective other content items that are associated with the media content item, determining ranking data for the plurality of search results based on the one or more respective other content items being associated with the media content item, and providing the plurality of search results for display based on the ranking data. The ranking data can be descriptive of non-fungible token search results being provided preference over general search results. In some implementations, the media content item can be provided for display before the one or more respective other content items.

The generated non-fungible token data can then be utilized when providing the media content item for display. For example, the systems and methods can include providing a media content item for display. The media content item can be a digital resource associated with a non-fungible token. In some implementations, the non-fungible token can be documented on a blockchain. The systems and methods can include obtaining input data from a user computing system. The input data can be descriptive of one or more inputs to interact with the media content item. Permission data associated with the media content item can be obtained based on the input data. The permission data can be stored on the blockchain. In some implementations, the permission data can be descriptive of one or more permissions associated with the media content item. The systems and methods can include providing a user interface element for display. The user interface element can include a notification. In some implementations, the notification can be descriptive of the one or more permissions associated with the media content item.

The systems and methods can provide a media content item for display. The media content item can be a digital resource associated with a non-fungible token. In some implementations, the non-fungible token can be documented on a blockchain. The media content item can include image data, video data, text data, multimodal data, audio data, virtual reality data, augmented reality data, and/or latent encoding data. The media content item can be provided for display in a user interface. In some implementations, the media content item can be provided for display in a user interface of a search results page, a social media platform, a shared content item storage platform, a blog platform, and/or other web platform. The media content item may be provided for display in response to a search query. Alternatively and/or additionally, the media content item may be provided in a social media feed and/or a news feed.

Input data can be obtained from a user computing system. The input data can be descriptive of one or more inputs to interact with the media content item. The input data can be descriptive of a request to copy and/or republish the media content item. The input data can be descriptive of one or more selections to a user interface, which may include an initial selection of the media content item, then one or more selections to a pop-up interface.

The systems and methods can obtain permission data associated with the media content item based on the input data. The permission data can be stored on the blockchain. In some implementations, the permission data can be descriptive of one or more permissions associated with the media content item. The one or more permissions can include one or more parameters for generating a copy of the media content item.

A user interface element can then be provided for display. The user interface element can include a notification. The notification can be descriptive of the one or more permissions associated with the media content item. Additionally and/or alternatively, the notification may provide one or more options for interacting with the media content item. The one or more options can be options that comply with the parameters set by the one or more permissions. For example, the one or more options provided may differ from one media content item to another media content item based on the level of interactions allowed based on the one or more permissions.

In some implementations, the systems and methods can include obtaining additional input data. The additional input data can be descriptive of a copy request to generate a copy of the media content item. The additional input data and the permission data can be processed to determine a response action. The response action can include generating a media content item dataset. The media content item dataset can include the permission data embedded in the media content item. Alternatively and/or additionally, the response action can include providing a rejection notification. The rejection notification can indicate that generating a copy is against the one or more permissions associated with the media content item.

The systems and methods can include embedding one or more identifiers in the content item data. For example, the systems and methods can include obtaining content item data from a user computing system. The content item data can be associated with a particular user. Permission data associated with the content item data can be obtained. In some implementations, the permission data can be descriptive of one or more permissions for interacting with the content item data. The systems and methods can include generating a content-specific identifier for the content item data. The content-specific identifier can include identification data that is specifically generated for the content item data. Augmented content item data can be generated by embedding the content-specific identifier in the content item data. The systems and methods can include generating non-fungible token data based on the permission data and the augmented content item data. The non-fungible token data can include the permission data. In some implementations, the non-fungible token data can reference the augmented content item data. The non-fungible token data can be registered with a blockchain.

The systems and methods can obtain content item data from a user computing system. The content item data can be associated with a particular user. The content item may be a media content item (e.g., an image, a video, a text string, a song, a virtual-reality asset, and/or an augmented-reality asset). The content item can be obtained via a user input, can be extracted from a webpage, and/or can be obtained from a database.

In some implementations, obtaining the content item data from the user computing system can include accessing a user-specific content item database (e.g., a web storage platform, a local drive, and/or a server storage drive) and providing a mint user interface. The mint user interface can include one or more selectable interface elements for initiating non-fungible token generation.

Permission data associated with the content item data can then be obtained. The permission data can be descriptive of one or more permissions for interacting with the content item data. In some implementations, the one or more permissions can be descriptive of one or more parameters for republishing the augmented content item data. The permission data may be descriptive of view preferences. For example, the permission data may indicate the content item may be provided for display as a preview, with a watermark, and/or in a lower resolution.

A content-specific identifier can then be generated for the content item data. The content-specific identifier can include identification data that is specifically generated for the content item data. In some implementations, the content-specific identifier can be a set of data that acts as a fingerprint for identifying the content item and copies of the content item throughout the internet and/or local drives. The content-specific identifier can include a watermark and/or other embedded data that may be readily viewable and/or may be indistinguishable to the viewers but identifiable via computer systems processing and rendering the data.

Augmented content item data can be generated by embedding the content-specific identifier in the content item data. The augmented content item data may be generated by one or more machine-learned models. For example, the one or more machine-learned models may process the content item data and the content-specific identifier to generate the augmented content item data. The one or machine-learned models can include an augmentation model, a segmentation model, an embedding model, an encoder model, a self-attention model, a decoder model, and/or a concatenation model.

The systems and methods can then generate non-fungible token data based on the permission data and the augmented content item data. The non-fungible token data can include the permission data. In some implementations, the non-fungible token data can reference the augmented content item data.

The non-fungible token data can then be registered with a blockchain. Registering the non-fungible token data can include minting a non-fungible token on the blockchain. The blockchain can be associated with a blockchain computing system. The blockchain computing system can include a decentralized and distributed computing system.

In some implementations, the systems and methods can include adding the non-fungible token data to a search database. The search database can then be queried in response to receiving a search input. The search database can include non-fungible token content items and unminted content items. The non-fungible token content items can be more heavily weighted and, therefore, more highly ranked when pulled for search purposes. The search database may hide other content items that are substantially similar to and/or the same as the content item and/or the augmented content item.

Alternatively and/or additionally, the systems and methods can include obtaining a search query. A plurality of search results responsive to the search query can then be determined. The plurality of search results can include a particular search result associated with the augmented content item data. One or more other search results associated with other content data can be determined to include the content-specific identifier. The augmented content item data can be provided for display without providing the one or more other search results.

In some implementations, the systems and methods disclosed herein can be utilized to mint a content item with an embedded identifier. The minted content item can then be obtained by a search engine in response to a search query. The minted content item can be upranked while unminted content items may be downranked. In some implementations, unminted content items that are substantially similar to or the same as the minted content item may be hidden while the minted content item is provided for display. Alternatively and/or additionally, the unminted content items can be provided for display with a link to the minted content item. The minted and/or the unminted content items may be provided for display with respective labels.

The systems and methods can include minting every content item added to a web platform to provide ownership for every content item added to the web platform.

In some implementations, the systems and methods disclosed herein can be utilized to track the use of advertisement content. Alternatively and/or additionally, the systems and methods disclosed herein can be utilized to track content items, which can allow for content creators to identify other uses of their content and request take downs and/or a portion of the created revenue.

Search platforms, social media platforms, and/or other web platforms may enforce the permissions by storing and/or identifying the permissions. The web platforms may check a blockchain to determine if a newly added content item is associated with a non-fungible token and/or is substantially similar to a digital resource of a non-fungible token.

In some implementations, displaying the content item can include displaying a card associated with the content item. The "front" of the card can include a preview of the content item, and the "back" of the card can include the one or more permissions associated with the content item.

Additionally and/or alternatively, a plurality of content items may be categorized based on their permissions. In some implementations, a search results page may provide search results with different permissions in different display panels. Alternatively and/or additionally, the search may be filtered by selected permissions.

The system and methods disclosed herein can be utilized for digital rights management of non-fungible tokens (NFTs) on search surfaces. For example, non-fungible token content may be elevated over non-NFT versions of the same content. In some implementations, non-NFT versions may be hidden.

In some implementations, the systems and methods disclosed herein can include providing one or more tools to a content owner to control display of the NFT content.

The systems and methods may be utilized to digital resources being generated and provided throughout the internet. The digital resources can be augmented to embed a content ID or other content fingerprint. In some implementations, a smart contract can be generated for the digital resource, which can then be embedded on a blockchain and attached to the digital resource. The smart contract may be descriptive of what other users and/or other systems can do with the digital resource.

The systems and methods of the present disclosure provide a number of technical effects and benefits. As one example, the system and methods can provide systems and methods for generating non-fungible token data with embedded permissions. For example, the systems and methods disclosed herein can leverage a blockchain for generating a non-fungible token that embeds the permissions such that the permissions are easily identifiable for display with the content item.

Another technical benefit of the systems and methods of the present disclosure is the ability to leverage identified permission data for informing third parties of permissions associated with a content item. For example, the systems and methods disclosed herein can process one or more user inputs associated with a content item, determine a non-fungible token associated with content item, determine one or more permissions associated with the content item, and provide an informational display associated with the one or more permissions. In particular, content items may be shared throughout the internet based on the one or more permissions and/or with the one or more permissions being continually tracked during republishing.

Another example of technical effect and benefit relates to improved computational efficiency and improvements in the functioning of a computing system. For example, the systems and methods disclosed herein can leverage the embedded permission data and content-specific identifiers to provide a continuous link to the content item without the computational expense of standard search.

With reference now to the Figures, example embodiments of the present disclosure will be discussed in further detail.

Example Devices and Systems

FIG. 1A depicts a block diagram of an example computing system 100 that performs digital rights management according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement a digital rights management system according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement a digital rights management system. The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The digital rights management system of the present disclosure can be provided as an element of a user interface of a website and/or application.

The data 136 can include data related to running a specialized application on the user computing system 130. In particular, the specialized application can be used to exchange data with server 110 over the network 160. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry keys, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130 can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to generate the non-fungible token data and/or provide a user interface for viewing and interacting with permissions. In some embodiments, the user computing system 130 performs any and all user interface display or generation.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170 can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be minted on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
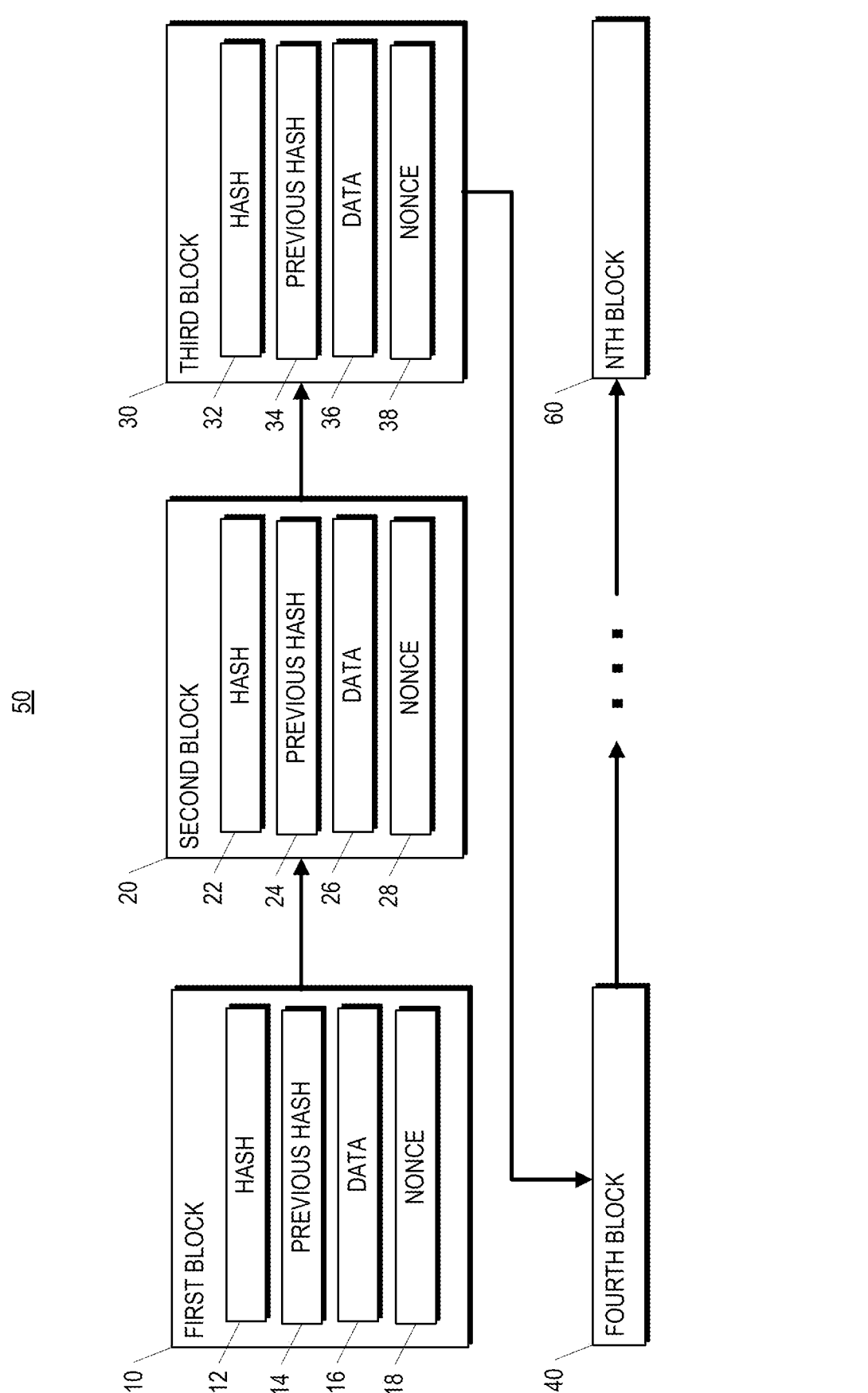
FIG. 1B depicts a block diagram of an example computing device that performs digital rights management according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction). The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50 can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain 50 can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling token data identification, obtainment, indexing, and deduplication.

Figure 9A:
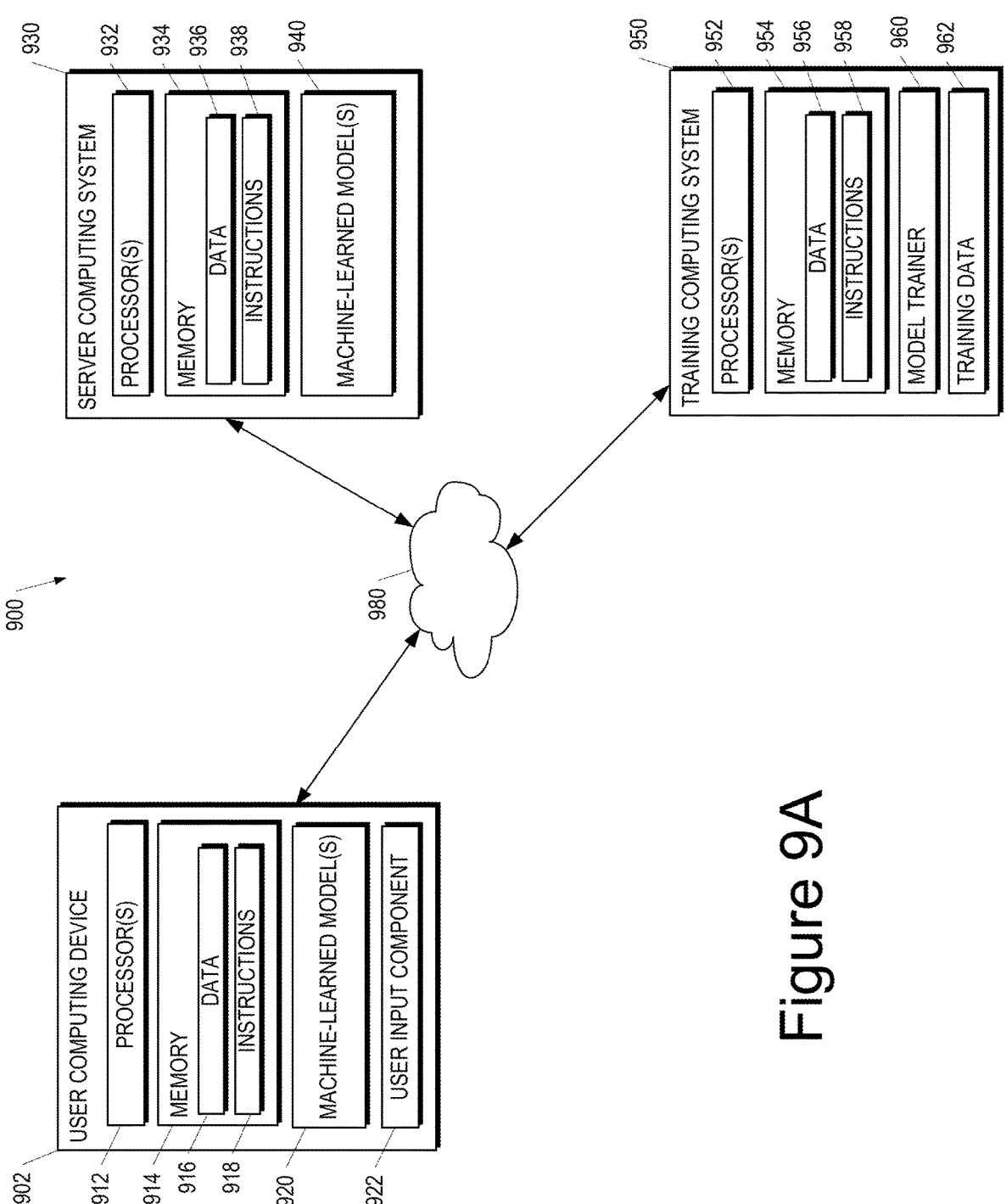
FIG. 9A depicts a block diagram of an example computing system that performs digital rights management according to example embodiments of the present disclosure.

FIG. 9A depicts a block diagram of an example computing system 900 that performs digital rights management according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more permissions models 920. For example, the permissions models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example permissions models 920 are discussed with reference to FIGS. 2-5.

In some implementations, the one or more permissions models 920 can be received from the server computing system 930 over network 980, stored in the user computing device memory 914, and then used or otherwise implemented by the one or more processors 912. In some implementations, the user computing device 902 can implement multiple parallel instances of a single permissions model 920 (e.g., to perform parallel content item dataset generation across multiple instances of content items).

More particularly, the one or more permissions models can generate one or more non-fungible token datasets. The one or more non-fungible token datasets can include augmented content items with embedded one or more content-specific identifiers. The one or more non-fungible token datasets can include embedded permission data that can be identified and provided with the content item.

Additionally or alternatively, one or more permissions models 940 can be included in or otherwise stored and implemented by the server computing system 930 that communicates with the user computing device 902 according to a client-server relationship. For example, the permissions models 940 can be implemented by the server computing system 940 as a portion of a web service (e.g., a digital rights management service). Thus, one or more models 920 can be stored and implemented at the user computing device 902 and/or one or more models 940 can be stored and implemented at the server computing system 930.

The user computing device 902 can also include one or more user input components 922 that receives user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned permissions models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2-5.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the permissions models 920 and/or 940 based on a set of training data 962. The training data 962 can include, for example, example permissions, example content-specific identifiers, ground truth training data, ground truth labels, and/or ground truth augmented content items.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
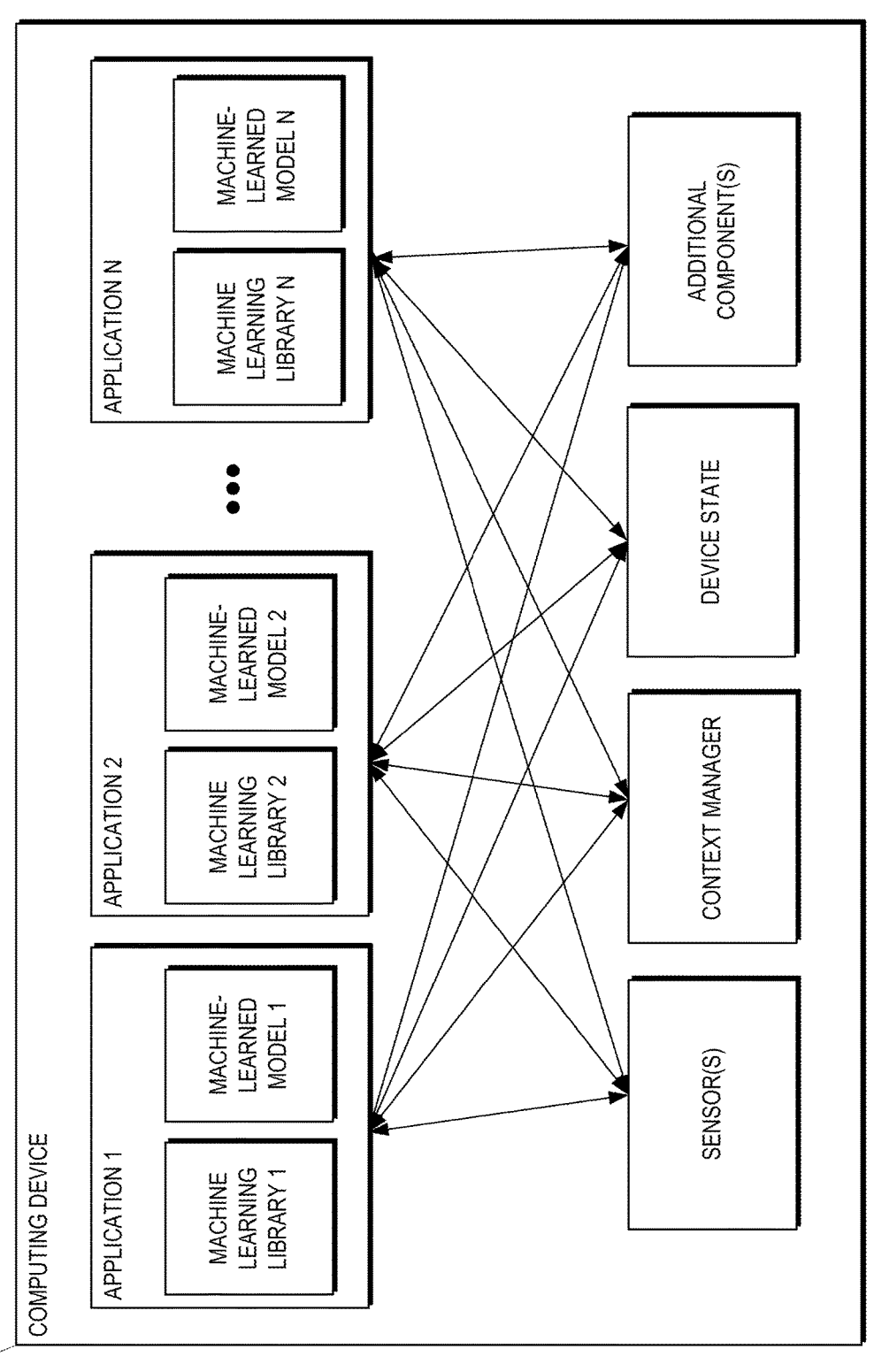
FIG. 9B depicts a block diagram of an example computing device that performs digital rights management according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
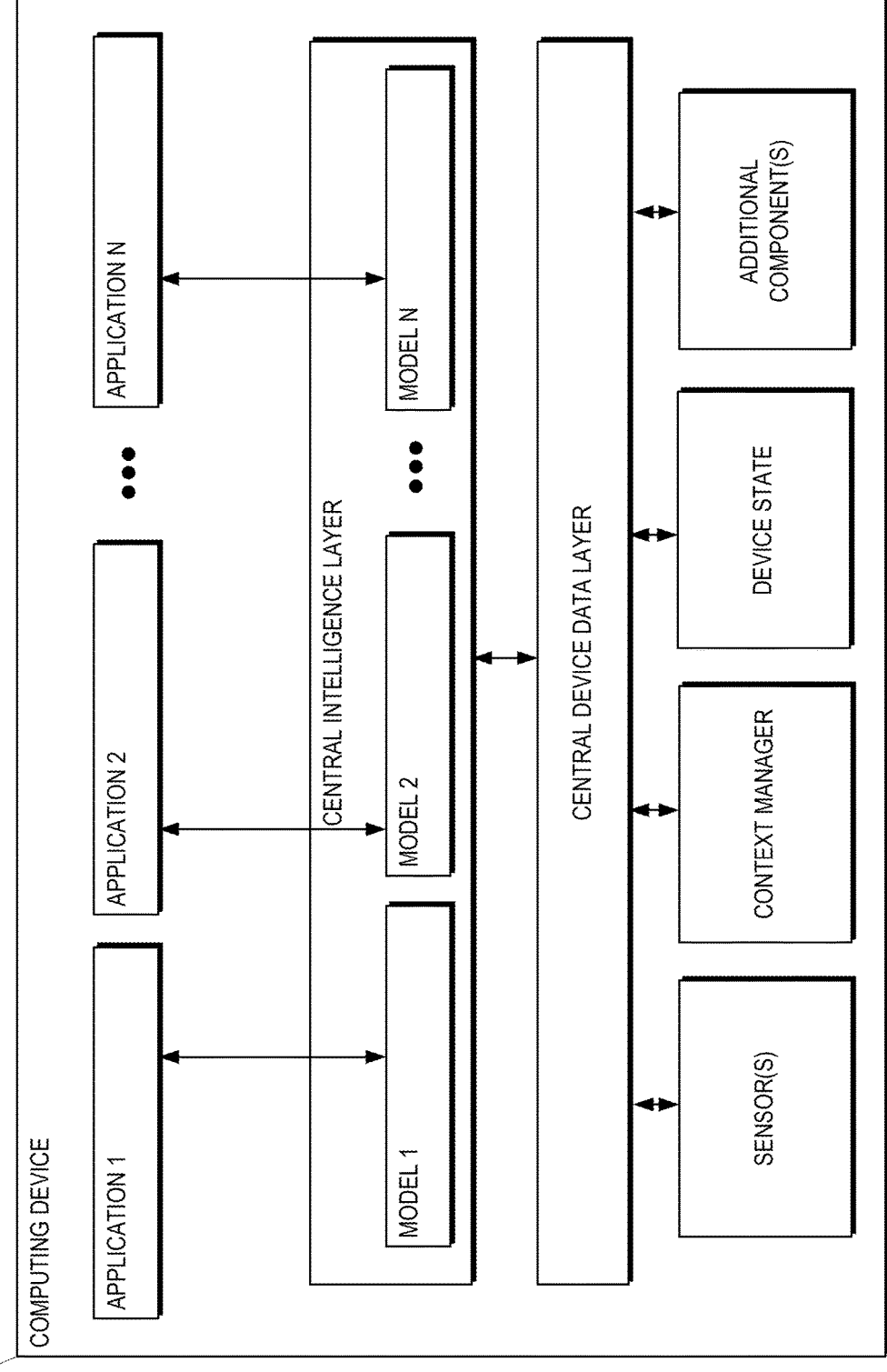
FIG. 9C depicts a block diagram of an example computing system that performs digital rights management according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2:
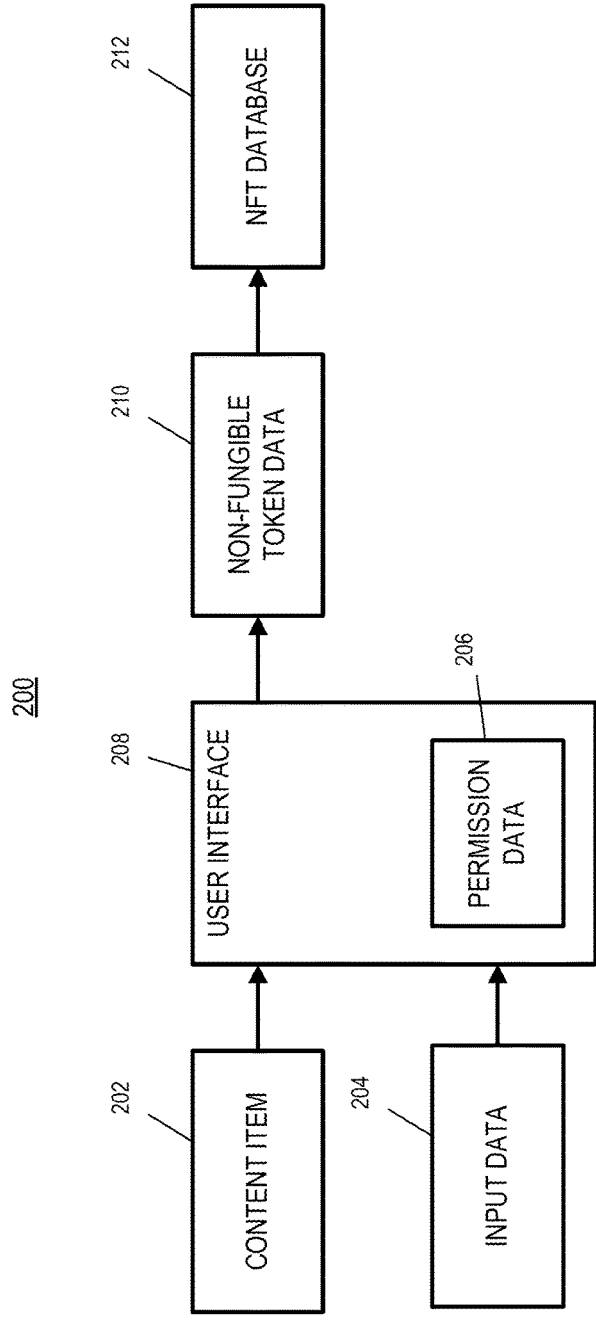
FIG. 2 depicts a block diagram of an example non-fungible token data generation system according to example embodiments of the present disclosure.

FIG. 2 depicts a block diagram of an example non-fungible token data generation system 200 according to example embodiments of the present disclosure. In some implementations, the non-fungible token data generation system 200 is configured to receive a content item and/or a set of input data 204 descriptive of a selected permissions for the content item 202 and, as a result of receipt of the content item 202 and the input data 204, provide output data that can include non-fungible token data 210 to be added to a non-fungible token database 212. Thus, in some implementations, the non-fungible token data generation system 200 can include a user interface 208 that is operable to receive the data that can then be utilized to generate the non-fungible token data 210.

In particular, the non-fungible token data generation system 200 can obtain a content item 202. The content item 202 can include image data, video data, audio data, text data, augmented reality data, virtual reality data, and/or latent encoding data. Additionally and/or alternatively, input data 204 can be obtained. The input data 204 can be processed to generate permission data 206. The permission data 206 can be descriptive of one or more selected permissions to be associated with the content item 202. The permission data can dictate how third party computing systems can interact with the content item 202. The content item 202 and/or the input data 204 may be obtained via a user interface 208.

The data obtained by the user interface 208 can be processed to generate non-fungible token data 210. The non-fungible token data 210 can include data descriptive of and/or referencing the content item 202. Additionally and/or alternatively, the non-fungible token data 210 can include data descriptive of a smart contract. In some implementations, the non-fungible token data 210 can include the permission data 206 embedded such that the permission data 206 may be associated with the content item 202, which can allow the permissions to be surfaced with the content item 202.

The non-fungible token data 210 can be registered to a blockchain. The non-fungible token data 210 can be added to a non-fungible token database 212, which can allow the content item 202 and respective permission data 206 to be searchable.

Figure 3:
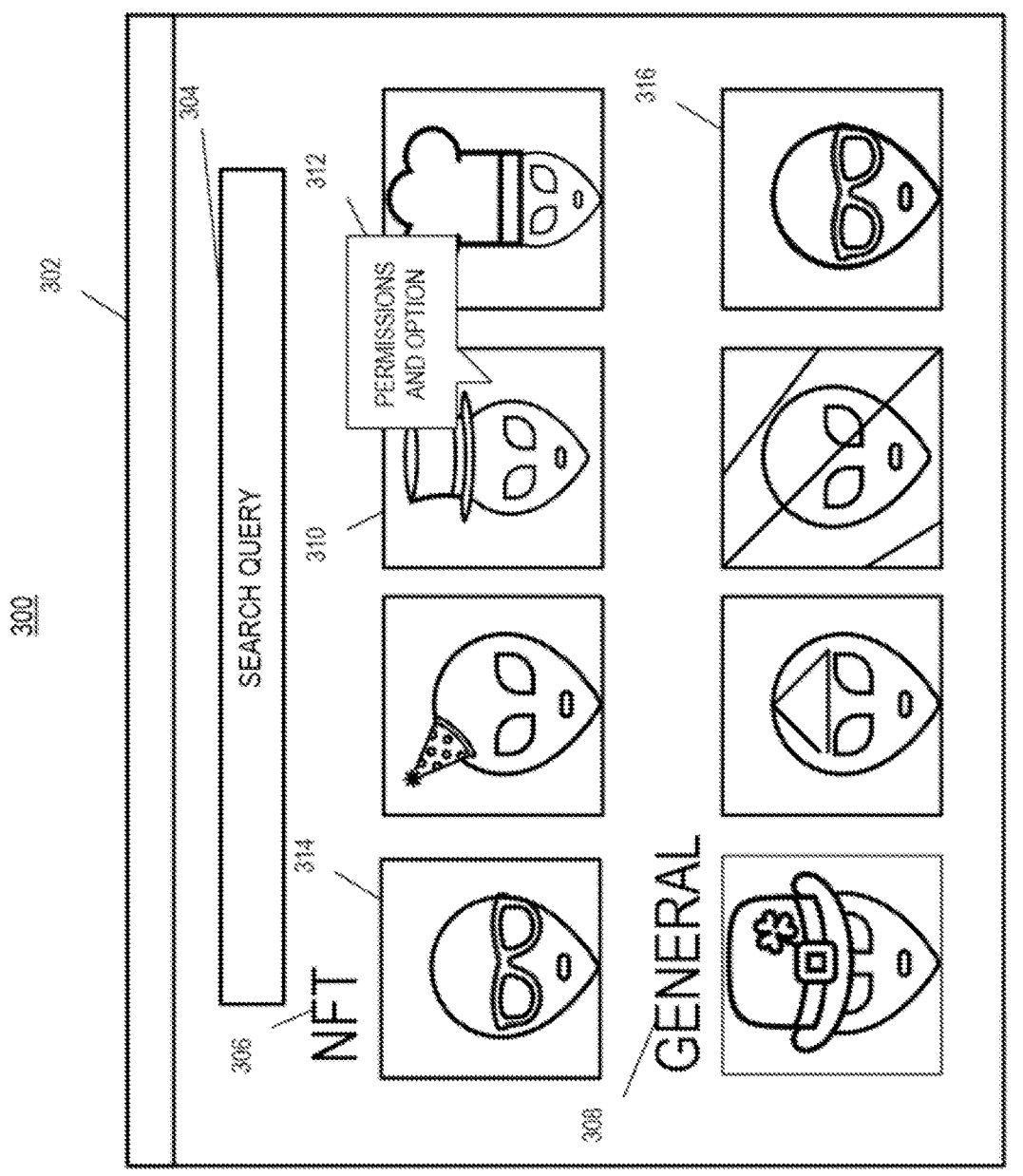
FIG. 3 depicts an illustration of an example search results page according to example embodiments of the present disclosure.

FIG. 3 depicts an illustration of an example search results page 300 according to example embodiments of the present disclosure. In particular, the example search results page 300 of FIG. 3 can be provided in a browser application 302 and/or a search engine application. The search results page 300 can include a search query input box 304 configured to receive search queries.

The input of the search query can result in a plurality of search results to be identified, which can include non-fungible token search results and/or general search results not associated with non-fungible tokens.

The non-fungible token search results can be provided for display in a non-fungible token search results panel 306. The general search results can be provided for display in a general search results panel 308. The first non-fungible token search result 314 can be the highest ranking search result and may be ranked higher that substantially similar general search results such as the fourth general search result 316.

The non-fungible token search results and/or the general search results may be interacted with to copy, save, and/or republish the content items. Interacting with the search results can cause a pop-up interface element 312 to be displayed. For example, interacting with the third non-fungible token search result 310 can cause the pop-up interface element 312 to be displayed. The pop-up interface element 312 can include information descriptive of the one or more permissions associated with the third non-fungible token search result. Alternatively and/or additionally, the pop-up interface element 312 can include one or more selectable options for interacting with the content item of the third non-fungible token search result (e.g., copy, copy with watermark, copy with permissions, redirect to permissions list, purchase non-fungible token, and/or copy with revenue link to inform non-fungible token owner of potential future revenue flow).

Figure 4:
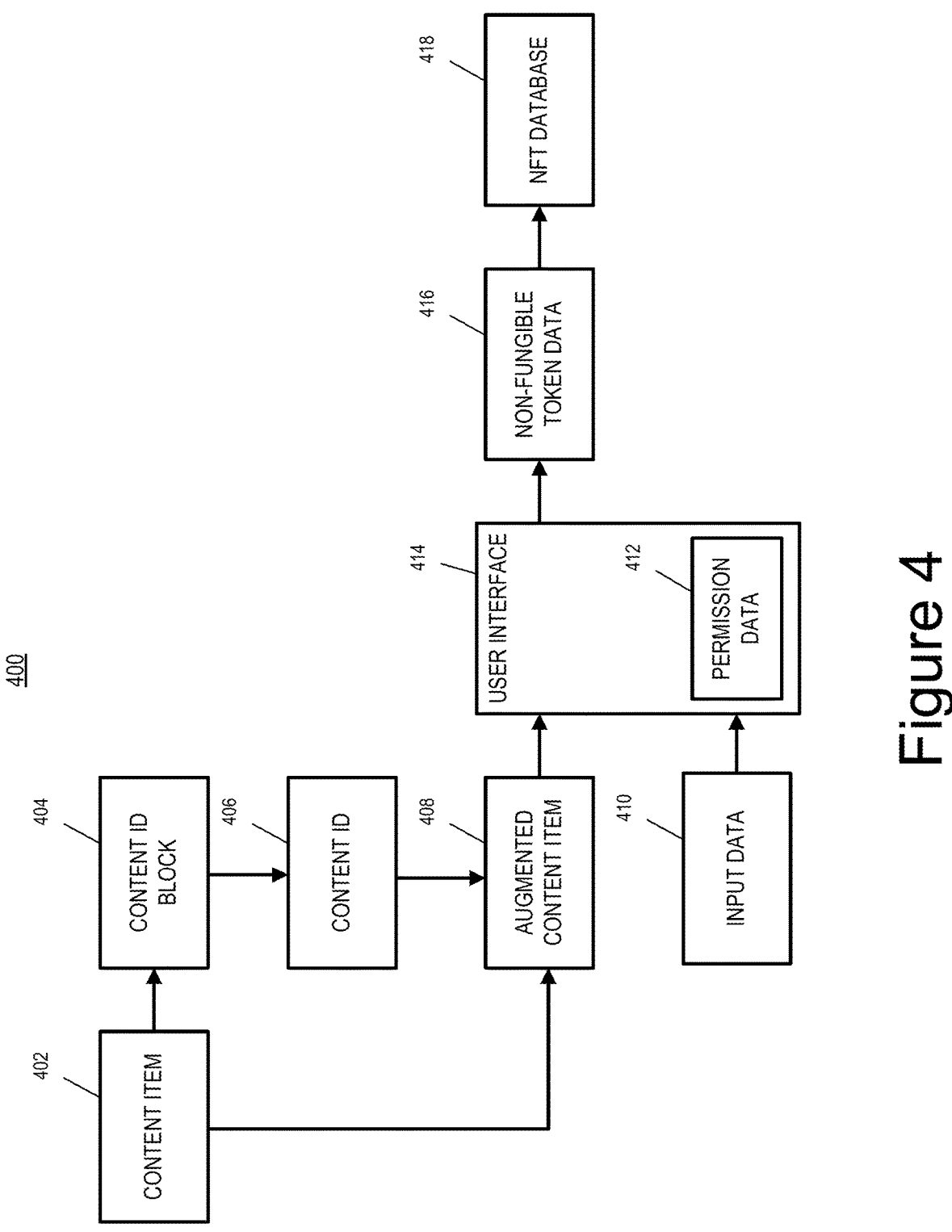
FIG. 4 depicts a block diagram of an example non-fungible token data generation system according to example embodiments of the present disclosure.

FIG. 4 depicts a block diagram of an example non-fungible token data generation system 400 according to example embodiments of the present disclosure. The non-fungible token data generation system 400 is similar to the non-fungible token data generation system 200 of FIG. 2 except that the non-fungible token data generation system 400 further includes augmented content item 408 generation.

In particular, the non-fungible token data generation system 400 can obtain a content item 402. The content item 402 can include image data, video data, audio data, text data, augmented reality data, virtual reality data, and/or latent encoding data.

The content item 402 can be processed by a content ID block 404 to generate a content ID 406 (e.g., one or more content-specific identifiers). The content ID block 404 can include one or more processors and/or one or more encryption blocks. The content ID 406 can be configured as a fingerprint specific for the content item 202. In some implementations, the content ID 406 may be searchable and unique for the particular content item 402.

The content item 402 and the content ID 406 can then be utilized to generate an augmented content item 408. The augmented content item 408 can be generated by concatenating the data and/or by one or more machine-learned models. In some implementations, the augmented content item 408 can include the content ID 406 embedded into content item 402.

Additionally and/or alternatively, input data 410 can be obtained. The input data 410 can be processed to generate permission data 412. The permission data 412 can be descriptive of one or more selected permissions to be associated with the content item 402. The permission data can dictate how third party computing systems can interact with the content item 402. The content item 402 and/or the input data 410 may be obtained via a user interface 414.

The data obtained by the user interface 414 can be processed to generate non-fungible token data 416. The non-fungible token data 416 can include data descriptive of and/or referencing the augmented content item 408. Additionally and/or alternatively, the non-fungible token data 416 can include data descriptive of a smart contract. In some implementations, the non-fungible token data 416 can include the permission data 412 embedded such that the permission data 412 may be associated with the augmented content item 408, which can allow the permissions to be surfaced with the augmented content item 408.

The non-fungible token data 416 can be registered to a blockchain. The non-fungible token data 416 can be added to a non-fungible token database 418, which can allow the augmented content item 408 and respective permission data 412 to be searchable.

Figure 5:
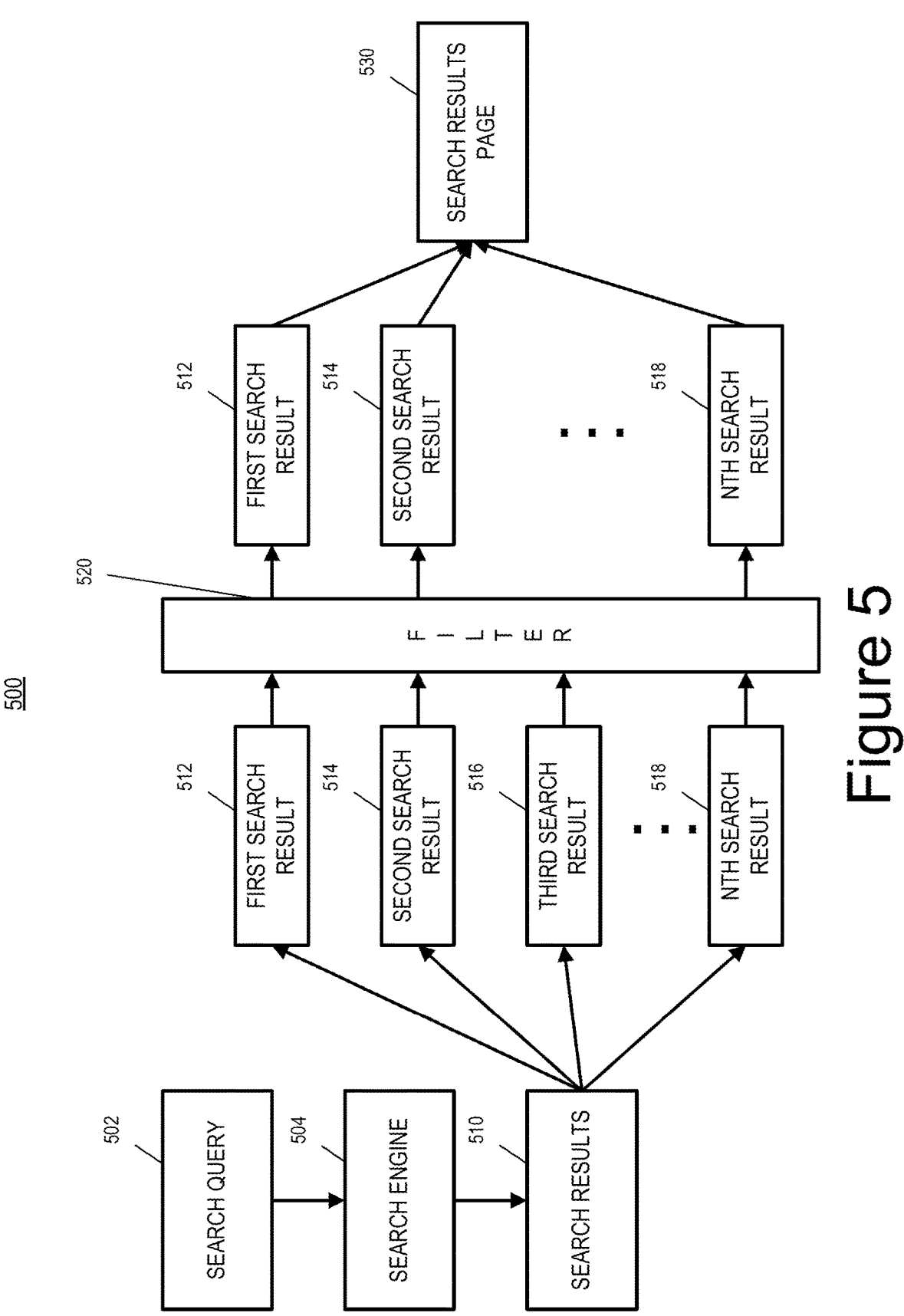
FIG. 5 depicts a block diagram of an example search results page generation system according to example embodiments of the present disclosure.

FIG. 5 depicts a block diagram of an example search results page generation system 500 according to example embodiments of the present disclosure. In particular, a search query 502 can be obtained. The search query 502 can be processed with a search engine 504 to determine and/or generate a plurality of search results 510. The plurality of search results 510 can include a first search result 512, a second search result 514, a third search result 516, and/or an nth search result 518.

The plurality of search results 510 can be filtered and ranked based on responsiveness to the search query, based on one or more contexts, and/or based on whether the search result is a duplicate of a digital resource of a non-fungible token. For example, the first search result 512, the second search result 514, the third search result 516, and/or the nth search result 518 can be processed by a filter block 520. The filter block 520 can filter out one or more search results to not be displayed. For example, the third search result 516 may be filtered out based on the third search result 516 being descriptive of a content item substantially similar to the content item of the first search result 512, which may be associated with a non-fungible token. The remaining search results can then be utilized to generate a search results page 530. The search results page 530 can then be provided to one or more users.

Example Methods

Figure 6:
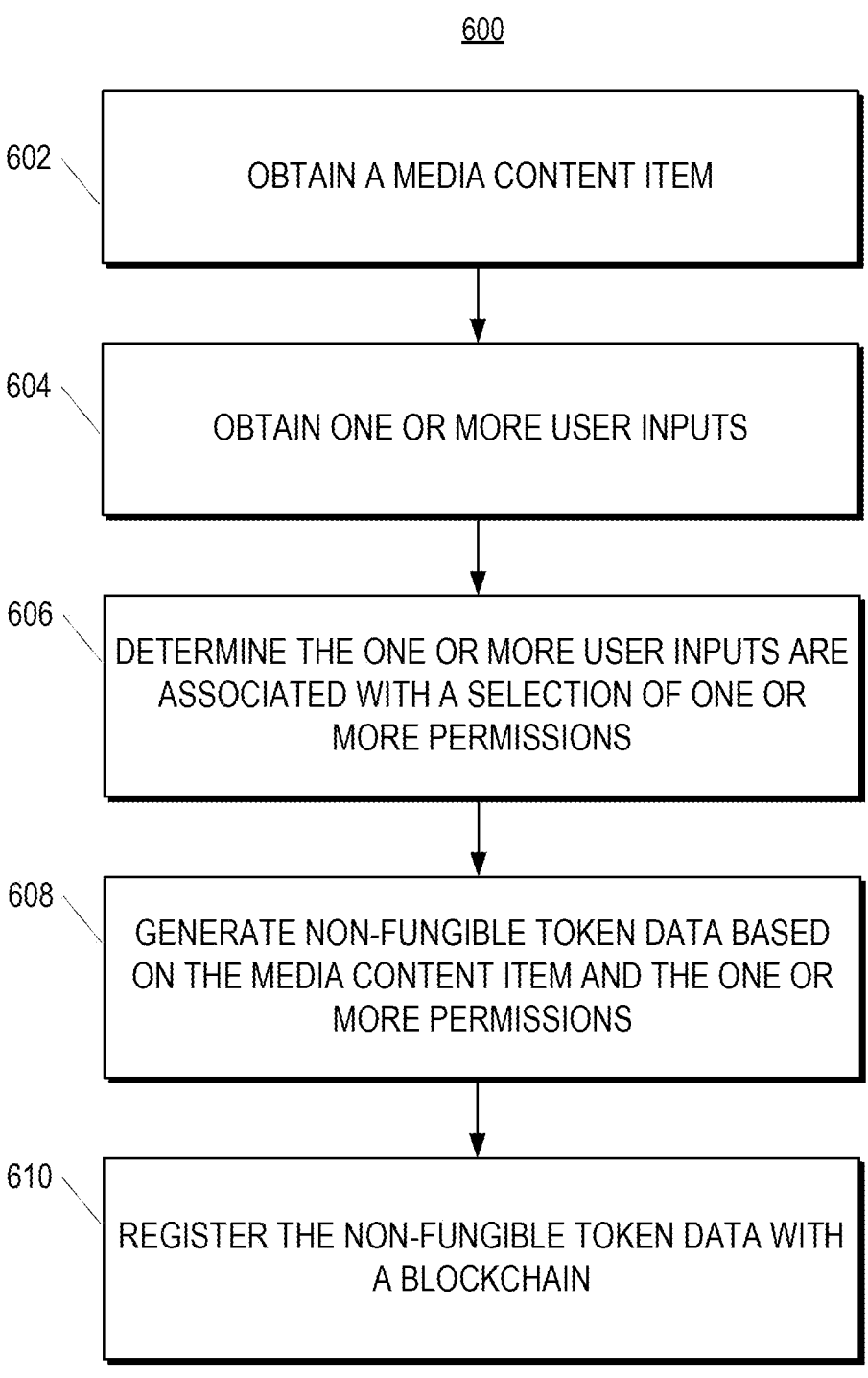
FIG. 6 depicts a flow chart diagram of an example method to perform permission-embedded non-fungible token generation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a media content item. The media content item can be associated with a particular user. The content item can include image data, video data, audio data, text data, and/or latent encoding data. The content item may be generated by and/or published by the particular user. The content item may be a content item stored locally by the particular user, may be stored in cloud storage for the particular user, and/or may be published on the web (e.g., on a social media website, a blog website, and/or a personal website).

At 604, the computing system can obtain one or more user inputs. The one or more user inputs can be associated with the particular user. The one or more user inputs can be obtained from a user computing system. In some implementations, the one or more user inputs can be inputs to a user interface provided via a server computing system. For example, one or more user interface elements can be provided in a content item management platform (e.g., a cloud storage web platform, a social media platform, and/or a content item repository platform). The one or more user inputs may be associated with a user interface with one or more options for selecting permissions to be associated with the obtained content item. For example, the one or more options can include do not allow republishing or copying, allow republishing or copying if revenue provided to original owner, allow republishing or copying freely, and/or any other form of permissions, which can include caveats manually input by a user.

At 606, the computing system can determine the one or more user inputs are associated with a selection of one or more permissions. The one or more permissions can be associated with the media content item. In some implementations, the one or more permissions can be associated with permissible interactions with the media content item. The permissible interactions can be associated with whether third parties can copy, republish, and/or share the content item. The determination can be based on heuristics, deterministic data, and/or one or more machine-learned parameters.

At 608, the computing system can generate non-fungible token data based on the media content item and the one or more permissions. One or more references to the media content item may be embedded in the non-fungible token data. In some implementations, the one or more permissions can be embedded in the non-fungible token data. The one or more permissions can be configured to be identifiable for display with the media content item. The non-fungible token data can include smart contract data. In some implementations, the payload of the smart contract associated with the smart contract data may be the content item. The content item may be viewed as a digital resource that may be transferred based on the criteria of the smart contract. The smart contract data can include the one or more permissions.

At 610, the computing system can register the non-fungible token data with a blockchain. The blockchain can be associated with a decentralized blockchain computing system. The non-fungible token data may be minted to the blockchain and may be associated with an electronic ledger that tracks transactions associated with the non-fungible token data. Additionally and/or alternatively, the non-fungible token data may be processed to generate index data associated with the non-fungible token data. The index data can then be added to a searchable database.

In some implementations, the computing system can obtain a display request associated with the media content item. The non-fungible token data associated with the media content item can be identified. The permission data associated with the media content item can then be obtained. A display dataset can then be generated. The display dataset can include the media content item and the permission data. The display dataset can be provided. In some implementations, the display request can be associated with a third party computing system. The display request can be generated based on a search query processed by a search engine. The media content item can be responsive to the search query. In some implementations, the computing system can determine the display request complies with the one or more preferences. The display dataset can include executable code for providing a user interface for displaying the one or more preferences in response to a selection of the media content item.

Alternatively and/or additionally, the computing system can obtain a search query from a third party computing system and process the search query to determine a plurality of search results responsive to the search query. The plurality of search results can include the media content item.

In some implementations, the computing system can determine the plurality of search results include one or more particular search results associated with one or more respective other content items that are associated with the media content item, determining ranking data for the plurality of search results based on the one or more respective other content items being associated with the media content item, and providing the plurality of search results for display based on the ranking data. The ranking data can be descriptive of non-fungible token search results being provided preference over general search results. In some implementations, the media content item can be provided for display before the one or more respective other content items.

Figure 7:
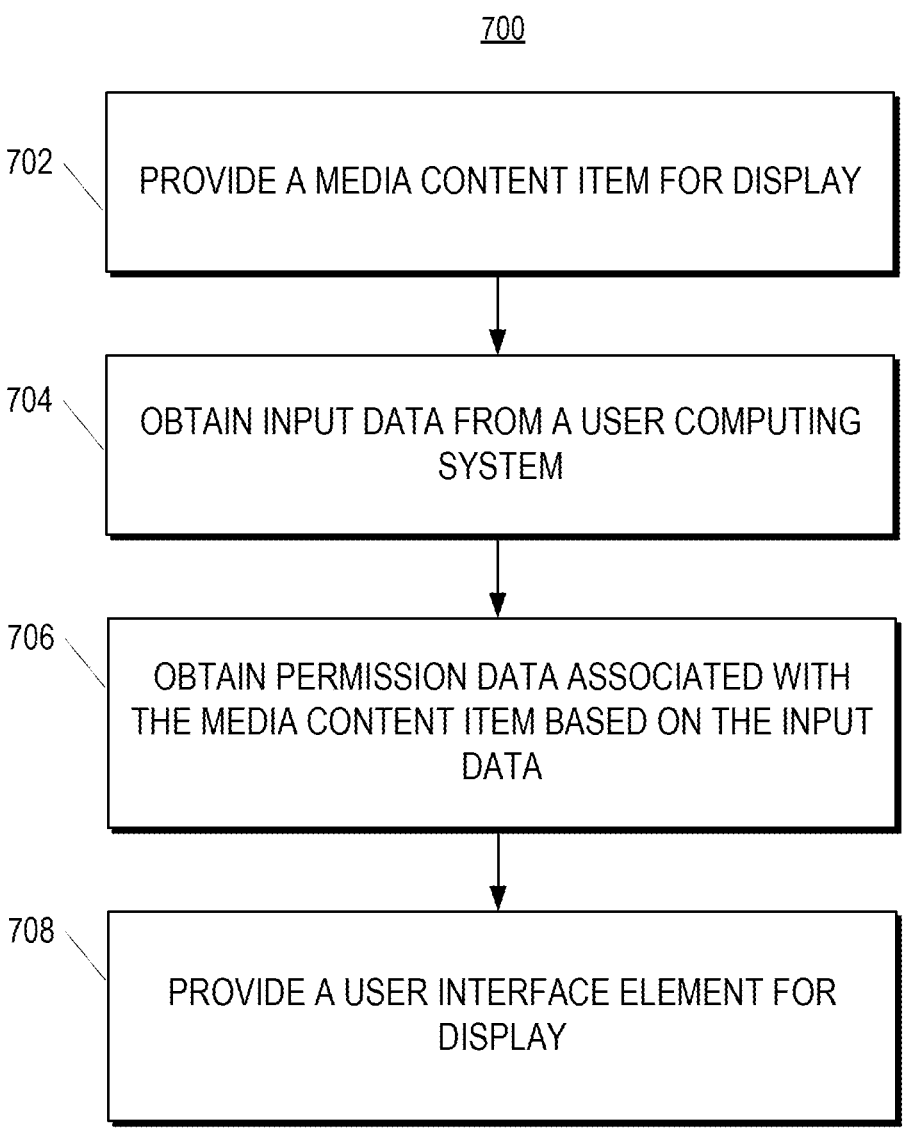
FIG. 7 depicts a flow chart diagram of an example method to perform permission-based display according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can provide a media content item for display. The media content item can be a digital resource associated with a non-fungible token. In some implementations, the non-fungible token can be documented on a blockchain. The media content item can include image data, video data, text data, multimodal data, audio data, virtual reality data, augmented reality data, and/or latent encoding data. The media content item can be provided for display in a user interface. In some implementations, the media content item can be provided for display in a user interface of a search results page, a social media platform, a shared content item storage platform, a blog platform, and/or other web platform. The media content item may be provided for display in response to a search query. Alternatively and/or additionally, the media content item may be provided in a social media feed and/or a news feed.

At 704, the computing system can obtain input data from a user computing system. The input data can be descriptive of one or more inputs to interact with the media content item. The input data can be descriptive of a request to copy and/or republish the media content item. The input data can be descriptive of one or more selections to a user interface, which may include an initial selection of the media content item, then one or more selections to a pop-up interface.

At 706, the computing system can obtain permission data associated with the media content item based on the input data. The permission data can be stored on the blockchain. In some implementations, the permission data can be descriptive of one or more permissions associated with the media content item. The one or more permissions can include one or more parameters for generating a copy of the media content item.

At 708, the computing system can provide a user interface element for display. The user interface element can include a notification. The notification can be descriptive of the one or more permissions associated with the media content item. Additionally and/or alternatively, the notification may provide one or more options for interacting with the media content item. The one or more options can be options that comply with the parameters set by the one or more permissions. For example, the one or more options provided may differ from one media content item to another media content item based on the level of interactions allowed based on the one or more permissions.

In some implementations, the computing system can obtain additional input data. The additional input data can be descriptive of a copy request to generate a copy of the media content item. The additional input data and the permission data can be processed to determine a response action. The response action can include generating a media content item dataset. The media content item dataset can include the permission data embedded in the media content item. Alternatively and/or additionally, the response action can include providing a rejection notification. The rejection notification can indicate that generating a copy is against the one or more permissions associated with the media content item.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain content item data from a user computing system. The content item data can be associated with a particular user. The content item may be a media content item (e.g., an image, a video, a text string, a song, a virtual-reality asset, and/or an augmented-reality asset). The content item can be obtained via a user input, can be extracted from a webpage, and/or can be obtained from a database.

In some implementations, obtaining the content item data from the user computing system can include accessing a user-specific content item database (e.g., a web storage platform, a local drive, and/or a server storage drive) and providing a mint user interface. The mint user interface can include one or more selectable interface elements for initiating non-fungible token generation.

At 804, the computing system can obtain permission data associated with the content item data. The permission data can be descriptive of one or more permissions for interacting with the content item data. In some implementations, the one or more permissions can be descriptive of one or more parameters for republishing the augmented content item data. The permission data may be descriptive of view preferences. For example, the permission data may indicate the content item may be provided for display as a preview, with a watermark, and/or in a lower resolution.

At 806, the computing system can generate a content-specific identifier for the content item data. The content-specific identifier can include identification data that is specifically generated for the content item data. In some implementations, the content-specific identifier can be a set of data that acts as a fingerprint for identifying the content item and copies of the content item throughout the internet and/or local drives. The content-specific identifier can include a watermark and/or other embedded data that may be readily viewable and/or may be indistinguishable to the viewers but identifiable via computer systems processing and rendering the data.

At 808, the computing system can generate augmented content item data by embedding the content-specific identifier in the content item data. The augmented content item data may be generated by one or more machine-learned models. For example, the one or more machine-learned models may process the content item data and the content-specific identifier to generate the augmented content item data. The one or machine-learned models can include an augmentation model, a segmentation model, an embedding model, an encoder model, a self-attention model, a decoder model, and/or a concatenation model.

At 810, the computing system can generate non-fungible token data based on the permission data and the augmented content item data. The non-fungible token data can include the permission data. In some implementations, the non-fungible token data can reference the augmented content item data.

At 812, the computing system can register the non-fungible token data with a blockchain. Registering the non-fungible token data can include minting a non-fungible token on the blockchain. The blockchain can be associated with a blockchain computing system. The blockchain computing system can include a decentralized and distributed computing system.

In some implementations, the computing system can add the non-fungible token data to a search database. The search database can then be queried in response to receiving a search input. The search database can include non-fungible token content items and unminted content items. The non-fungible token content items can be more heavily weighted and, therefore, more highly ranked when pulled for search purposes. The search database may hide other content items that are substantially similar to and/or the same as the content item and/or the augmented content item.

Alternatively and/or additionally, the computing system can obtain a search query. A plurality of search results responsive to the search query can then be determined. The plurality of search results can include a particular search result associated with the augmented content item data. One or more other search results associated with other content data can be determined to include the content-specific identifier. The augmented content item data can be provided for display without providing the one or more other search results.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for digital rights management, the system comprising:

one or more processors; and one or more non-transitory computer-readable media that collectively store instructions that, when executed by the one or more processors, cause the computing system to perform operations, the operations comprising:

obtaining a media content item, wherein the media content item is associated with a particular user;

obtaining one or more user inputs, wherein the one or more user inputs are associated with the particular user;

determining the one or more user inputs are associated with a selection of one or more permissions, wherein the one or more permissions are associated with the media content item;

generating non-fungible token data based on the media content item and the one or more permissions, wherein one or more references to the media content item are embedded in the non-fungible token data, wherein the one or more permissions are embedded in the non-fungible token data, and wherein the one or more permissions are configured to be identifiable for display with the media content item, wherein generating the non-fungible token data further comprises embedding a content-specific identifier within the media content item based on processing the media content item with a machine-learned augmentation model to generate augmented content item data, wherein the embedded data of the content-specific identifier is indistinguishable to viewers of the media content item and identifiable via computer systems processing and rendering data, and wherein the content-specific identifier is a set of data that acts as a fingerprint for identifying the media content item and copies of the media content item throughout an internet;

registering the non-fungible token data with a blockchain, wherein the blockchain is associated with a decentralized blockchain computing system;

obtaining a search query;

determining the media content item is responsive to the search query;

providing the media content item for display within a search results interface; and managing interactions with the media content item in the search results interface based on accessing the non-fungible token data on the blockchain.

2. The system of claim 1, wherein the operations further comprise:

obtaining a display request associated with the media content item;

identifying the non-fungible token data associated with the media content item;

obtaining permission data associated with the media content item, wherein the permission data is descriptive of the one or more permissions;

generating a display dataset, wherein the display dataset comprises the media content item and the permission data; and providing the display dataset.

3. The system of claim 2, wherein the display request is associated with a third party computing system, wherein the display request is generated based on the search query processed by a search engine, and wherein the media content item is responsive to the search query.

4. The system of claim 2, wherein the operations further comprise:

determining the display request complies with the one or more preferences.

5. The system of claim 2, wherein the display dataset comprises executable code for providing a user interface for displaying the one or more preferences in response to a selection of the media content item.

6. The system of claim 1, wherein the operations further comprise:

obtaining the search query from a third party computing system; and processing the search query to determine a plurality of search results responsive to the search query, wherein the plurality of search results comprise the media content item.

7. The system of claim 6, wherein the operations further comprise:

determining the plurality of search results comprise one or more particular search results associated with one or more respective other content items that are associated with the media content item;

determining ranking data for the plurality of search results based on the one or more respective other content items being associated with the media content item; and providing the plurality of search results for display based on the ranking data.

8. The system of claim 7, wherein the ranking data is descriptive of non-fungible token search results being provided preference over general search results.

9. The system of claim 7, wherein the media content item is provided for display before the one or more respective other content items.

10. The system of claim 1, wherein the one or more permissions are associated with permissible interactions with the media content item.

11. A computer-implemented method for digital rights management, the method comprising:

providing, by a computing system comprising one or more processors, a media content item for display, wherein the media content item is a digital resource associated with a non-fungible token, wherein the non-fungible token is documented on a blockchain, wherein the media content item comprises a content-specific identifier embedded within the media content item based on processing the media content item with a machine-learned augmentation model to generate augmented content item data, wherein embedded data of the content-specific identifier is indistinguishable to viewers of the media content item and identifiable via computer systems processing and rendering data, and wherein the content-specific identifier is a set of data that acts as a fingerprint for identifying the media content item and copies of the media content item throughout an internet;

obtaining, by the computing system, input data from a user computing system, wherein the input data is descriptive of one or more inputs to interact with the media content item;

obtaining, by the computing system, permission data associated with the media content item based on the input data, wherein the permission data is stored on the blockchain, and wherein the permission data is descriptive of one or more permissions associated with the media content item; and providing, by the computing system, a user interface element for display, wherein the user interface element comprises a notification, wherein the notification is descriptive of the one or more permissions associated with the media content item, wherein the notification provides one or more options for interacting with the media content item based on the permission data stored on the blockchain, wherein the one or more options are determined based on permission data comprising permissible actions associated with whether a third party is allowed to at least one of copy the media content item, republish the media content item, or share the media content item, wherein the user interface element comprises a pop-up interface element that provides permission information for display overlaid over a portion of a search results page.

12. The method of claim 11, further comprising:

obtaining, by the computing system, additional input data, wherein the additional input data is descriptive of a copy request to generate a copy of the media content item; and processing, by the computing system, the additional input data and the permission data to determine a response action.

13. The method of claim 12, wherein the response action comprises:

generating, by the computing system, a media content item dataset, wherein the media content item dataset comprises the permission data embedded in the media content item.

14. The method of claim 12, wherein the response action comprises:

providing, by the computing system, a rejection notification, wherein the rejection notification indicates that generating a copy is against the one or more permissions associated with the media content item.

15. The method of claim 11, wherein the one or more permissions comprise one or more parameters for generating a copy of the media content item.

16. One or more non-transitory computer-readable media that collectively store instructions that, when executed by one or more computing devices, cause the one or more computing devices to perform operations, the operations comprising:

obtaining content item data from a user computing system, wherein the content item data is associated with a particular user;

obtaining permission data associated with the content item data, wherein the permission data is descriptive of one or more permissions for interacting with the content item data;

generating a content-specific identifier for the content item data, wherein the content-specific identifier comprises identification data that is specifically generated for the content item data;

generating augmented content item data by embedding the content-specific identifier in the content item data, wherein generating the augmented content item data further comprises embedding the content-specific identifier within a media content item of the content item data based on processing the media content item with a machine-learned augmentation model to generate the augmented content item data, wherein the embedded data of the content-specific identifier is indistinguishable to viewers of the media content item and identifiable via computer systems processing and rendering data, and wherein the content-specific identifier is a set of data that acts as a fingerprint for identifying the media content item and copies of the media content item throughout an internet;

generating non-fungible token data based on the permission data and the augmented content item data, wherein the non-fungible token data comprises the permission data, and wherein the non-fungible token data references the augmented content item data;

registering the non-fungible token data with a blockchain;

processing the non-fungible token data to generate index data associated with the non-fungible token data;

storing the index data in a searchable database;

obtaining a search query;

determining, based on the index data in the searchable database, the content item data is responsive to the search query;

providing the augmented content item data for display within a search results interface without providing copies of the media content item that are determined based on the embedded data of the content-specific identifier; and managing interactions with the augmented content item data in the search results interface based on accessing the non-fungible token data on the blockchain.

17. The one or more non-transitory computer-readable media of claim 16, wherein the operations further comprise:

determining a plurality of search results responsive to the search query, wherein the plurality of search results comprise a particular search result associated with the augmented content item data;

determining one or more other search results associated with other content data comprising the content-specific identifier; and providing the augmented content item data without pro-
viding the one or more other search results.

18. The one or more non-transitory computer-readable media of claim 16, wherein obtaining the content item data from the user computing system comprises:

accessing a user-specific content item database; and providing a mint user interface, wherein the mint user interface comprises one or more selectable interface elements for initiating non-fungible token generation.

19. The one or more non-transitory computer-readable media of claim 16, wherein the operations further comprise:

adding the non-fungible token data and the augmented content item data to the searchable database.

20. The one or more non-transitory computer-readable media of claim 16, wherein the one or more permissions are descriptive of one or more parameters for republishing the augmented content item data.

\* \* \* \* \*